F. D. GLOSSER.
MEASURING INSTRUMENT.
APPLICATION FILED JULY 13, 1909.
967,510.
Patented Aug. 16, 1910.
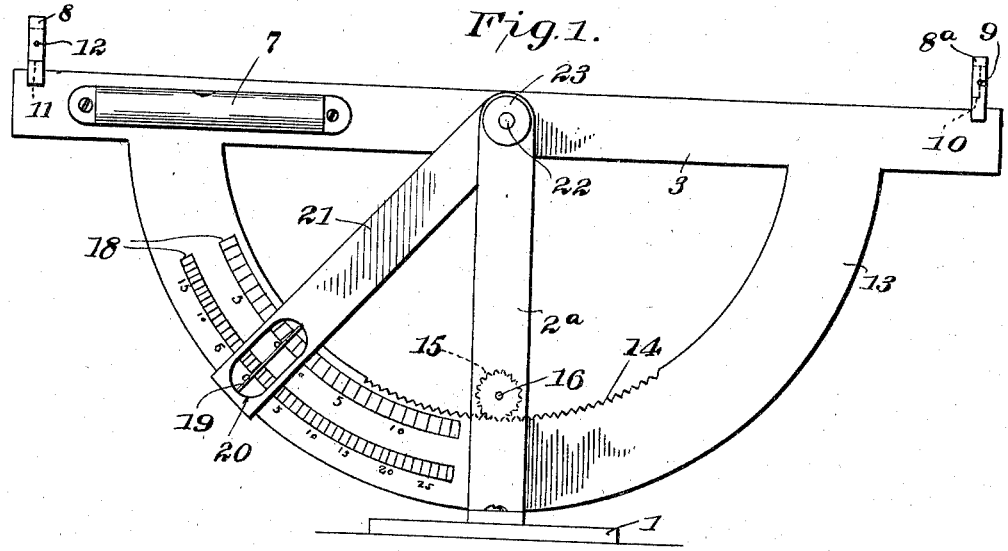
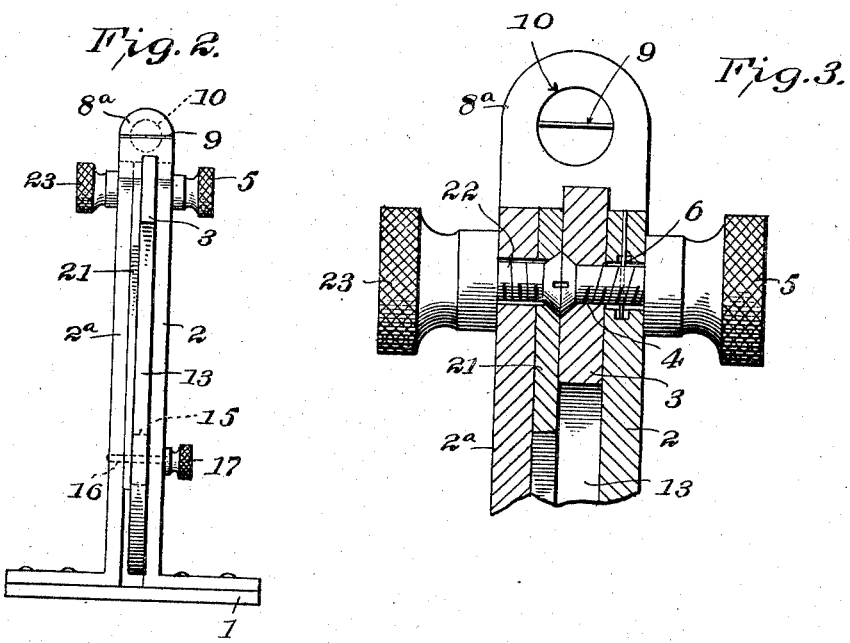
Witnesses
Inventor
F. D. Glosser,
By
Attorneys

UNITED STATES PATENT OFFICE.

FRANK D. GLOSSER, OF MARION, OHIO, ASSIGNOR OF ONE-HALF TO ARTHUR J. BERRY, OF MARION, OHIO.

MEASURING INSTRUMENT.

967,510.  Specification of Letters Patent.  Patented Aug. 16, 1910.

Application filed July 13, 1909. Serial No. 507,387.

*To all whom it may concern:*

Be it known that I, FRANK D. GLOSSER, citizen of the United States, residing at Marion, in the county of Marion and State of Ohio, have invented certain new and useful Improvements in Measuring Instruments, of which the following is a specification.

This invention comprehends certain new and useful improvements in measuring instruments for use in ascertaining the height of a remote object, and the invention aims to provide a simple, durable and efficient construction of device of this character that is susceptible of being employed at different known distances from the object to be measured and that is arranged after having been sighted at the same to indicate the height thereof with considerable accuracy.

With this and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a side elevation of a measuring instrument constructed in accordance with my invention; Fig. 2 is an end view thereof; and, Fig. 3 is an enlarged transverse section illustrating the manner of connecting the sighting beam and the pointer to the standards.

Corresponding and like parts are referred to in the following description and indicated in all the views of the drawing by the same reference characters.

Referring to the drawing, the numeral 1 designates a substantially flat base to which are secured two slightly spaced standards 2 and 2$^a$. A sighting beam 3 is arranged between the upper ends of these standards and is pivoted near its middle point to one of the same, say the standard 2. In the present instance this pivotal connection is established through the instrumentality of a screw 4 that is passed through the parts with its threaded extremity projecting outwardly beyond the standard 2 and having a thumb nut 5 working thereon in order to maintain the screw in place and regulate the frictional contact between the beam and the standard. The screw 4 is prevented from turning in the standard 2 by any suitable means, such as a pin 6 inserted therethrough.

The sighting beam 3 carries a spirit level 7 and is also equipped at its opposite ends with front and rear sights 8 and 8$^a$. While it is to be understood that I do not limit myself to any particular form of sights, still the preferred embodiment of the same is illustrated in the drawing wherein the rear sight 8$^a$ is shown as formed in its rear face with a horizontal slot 9 that opens into a relatively large counterbore 10 formed in the front face of the sight. The front sight 8 has an aperture 11 extending therethrough with a wire 12 stretched horizontally thereacross and adapted in the use of the instrument to be brought into coincidence with the slot 9.

A semicircular arc 13 depends from the beam 3 and is rigidly secured thereto and is movable therewith between the spaced standards 2 and 2$^a$. The inner edge of this arc is serrated to form a rack 14 that has a meshing engagement with a pinion 15 secured on a spindle 16. The spindle is journaled transversely of the spaced standards and has one end extended beyond one of the same and provided with a knob 17, the latter being designed to be turned to cause the sighting beam to be rocked about its axis and thus admit of the same being expeditiously adjusted to different vertical angles when sighting at the object to be measured.

The arc 13 is provided with two or more parallel scales 18 which are designed to be used respectively when the instrument is placed at different known distances from the object to be measured, as for instance twenty five and fifty feet. Each of these scales is graduated to indicate the number of feet rise or fall for different vertical angles, at the known distance from the object. The zero graduations of the two scales are coincident and are arranged substantially at an angle of forty-five degrees to the beam 3, the graduations of each scale extending on both sides of the zero graduation, whereby to render the device susceptible of use for both angles of elevation and depression.

A wire 19 is provided for indicating the measurements on both of the scales 18 and is stretched longitudinally of a slot 20 formed at the swinging end of an arm or pointer 21. At its other end this arm is fastened to a screw 22 that is passed through the upper end of the standard 2ª with its threaded extremity projecting outwardly there beyond. A thumb nut 23 works on the projecting extremity of the screw to clamp the arm 21 in different adjusted positions. The screw 22 is arranged in alinement with the screw 4 and has its head disposed in abutting relation to the head of the latter. It will thus be observed that the axes of the sighting beam and the arm are coincident. However, attention is particularly directed to the fact that by employing two screws for pivoting the arm and beam independently of each other, one of these parts may be clamped in adjusted position without interfering with the relative movement of the other.

In the practical use of the instrument, the same is first placed at the requisite distance from the object for which one of the scales 18 is calibrated. The sighting beam 3 is disposed in the direction of the object and is brought to a level by turning the knob of the spindle 16. The arm 21 is then swung about its pivot until the wire 19 coincides with the zero graduation of the scale, and is clamped in such position by the nut 23, the parts then assuming the positions illustrated in Fig. 1. The sighting beam is turned by manipulating the knob 17 to assume the requisite angle of depression for sighting at the base of the object, and note is taken of the graduation of the said scale 18, which is brought into correspondence with the wire 19. The above operation is repeated for sighting at the top of the object, and by adding the two readings together the total height of the object may be readily ascertained.

Having thus described the invention what is claimed as new is:

1. A measuring instrument comprising a pivoted sighting beam, an arc secured to the sighting beam and provided with a scale, a swinging pointer adapted to indicate measurements on the scale and pivoted independently of the beam with its axis coincident with the axis thereof, means for clamping the pointer in adjusted position, and means coöperating with the arc for turning the beam about its pivot.

2. A measuring instrument comprising a pivoted sighting beam, an arc secured to the beam and provided with a plurality of concentric scales, a swinging pointer adapted to indicate measurements on both of the scales and pivoted independently of the sighting beam with its axis coincident with the axis thereof, and means for clamping the pointer in different adjusted positions.

3. A measuring instrument comprising a pivoted sighting beam, an arc secured to the sighting beam and provided with separate scales, a swinging pointer formed at its swinging end with a slot and pivoted independently of the sighting beam with its axis coincident with the axis thereof, and a wire mounted in the slot and arranged to correspond with graduations on both scales.

4. A measuring instrument comprising a base, spaced standards, a sighting beam interposed between the standards, a pivot screw passed through the sighting beam and one of the standards, an arc secured to the sighting beam and provided with a scale, a swinging pointer for indicating measurements on the scale, and a pivot screw passed through the pointer and the other standard to pivot the former independently of the beam, the said pivot screws being disposed in alinement with their heads arranged in abutting relation.

5. A measuring instrument comprising a base, spaced standards, a sighting beam interposed between the standards, a pivot screw passed through the sighting beam and one of the standards with its extremity projecting beyond the latter, an arc secured to the sighting beam and provided with a scale, a pointer arranged to indicate measurements on the scale and disposed at one end between the standards, a second pivot screw passing through the pointer and the other standard with its extremity projecting beyond the latter, and clamping nuts working on the projecting extremities of the screws, the pivot screws being disposed in alinement with their heads arranged in abutting relation.

6. A measuring instrument including a pivoted sighting beam, a graduated arc carried by and movable with the sighting beam, and a pointer arranged to indicate measurements on the arc and pivotally mounted with its axis in alinement with the axis of the sighting beam.

7. A measuring instrument including a pivoted sighting beam, an arc carried by and movable with the sighting beam and provided with a scale, a pointer adapted to indicate measurements on the scale and pivotally mounted with its axis in alinement with the axis of the sighting beam, whereby to be movable freely along the scale, and means for holding the pointer in different adjusted positions independently of the beam.

8. A measuring instrument including a base, spaced standards secured to the base, a sighting beam pivotally connected to one of the standards, a graduated arc carried by and movable with the sighting beam, and a pointer pivotally connected to the other standard with its axis in alinement with the axis of the sighting beam, the pointer being adapted to indicate measurements on the arc and being movable along the same.

9. A measuring instrument comprising a base, spaced standards secured to the base, a sighting beam pivotally connected to one of the standards, a graduated arc carried by and movable with the sighting beam, a pointer pivotally connected to the other standard with its axis in alinement with the axis of the sighting beam, the pointer being arranged to indicate measurements on the arc and being movable along the same, means for clamping the sighting beam in different adjusted positions independently of the pointer, and means for clamping the pointer in different adjusted positions independently of the sighting beam.

10. A measuring instrument comprising a base, spaced standards pivotally connected to the base, separate pivot members passed through the respective standards and disposed in alinement, a sighting beam pivotally mounted on one of said members, a graduated arc carried by and movable with the sighting beam, and a swinging pointer pivotally mounted on the other pivot member and arranged to indicate measurements on the arc and movable along the same.

In testimony whereof I affix my signature in presence of two witnesses.

FRANK D. GLOSSER. [L. S.]

Witnesses:
 FRED LUSCH, Jr.,
 E. E. GLOSSER.